United States Patent [19]

Tanis

[11] Patent Number: 4,768,525
[45] Date of Patent: Sep. 6, 1988

[54] STONE EJECTION DOOR MECHANISM FOR HARVESTING EQUIPMENT

[75] Inventor: Dale R. Tanis, Naperville, Ill.

[73] Assignee: J. I. Case Company, Racine, Wis.

[21] Appl. No.: 91,494

[22] Filed: Aug. 31, 1987

[51] Int. Cl.[4] .............................................. A01F 7/00
[52] U.S. Cl. .................................. 130/27 JT; 56/10.2
[58] Field of Search ..................... 56/10.2, DIG. 15; 130/27 JT, 27 R

[56] References Cited

U.S. PATENT DOCUMENTS

| | | | |
|---|---|---|---|
| 3,576,188 | 4/1971 | Tanis | 130/27 JT |
| 4,275,546 | 6/1981 | Bohman | 56/10.2 |
| 4,322,933 | 4/1982 | Seymour | 56/10.2 |
| 4,335,563 | 6/1982 | Rice et al. | 56/10.2 |
| 4,353,199 | 10/1982 | Chow et al. | 56/10.2 |

*Primary Examiner*—Stephen F. Husar
*Attorney, Agent, or Firm*—Dressler, Goldsmith, Shore, Sutker & Milnamow, Ltd.

[57] ABSTRACT

A stone ejection door mechanism for harvesting equipment comprising a stone sensing mechanism which will sense the presence of stones being ingested into the combine. A trap door mechanism including front and rear doors which are opened when stones are detected in the entering crop. The front door is moved to the open position when the presence of stones is sensed, and this opening movement acts through a chain and sprocket to rapidly open the rear door. After the stones have been ejected, the front door is closed followed by the rear door.

4 Claims, 3 Drawing Sheets

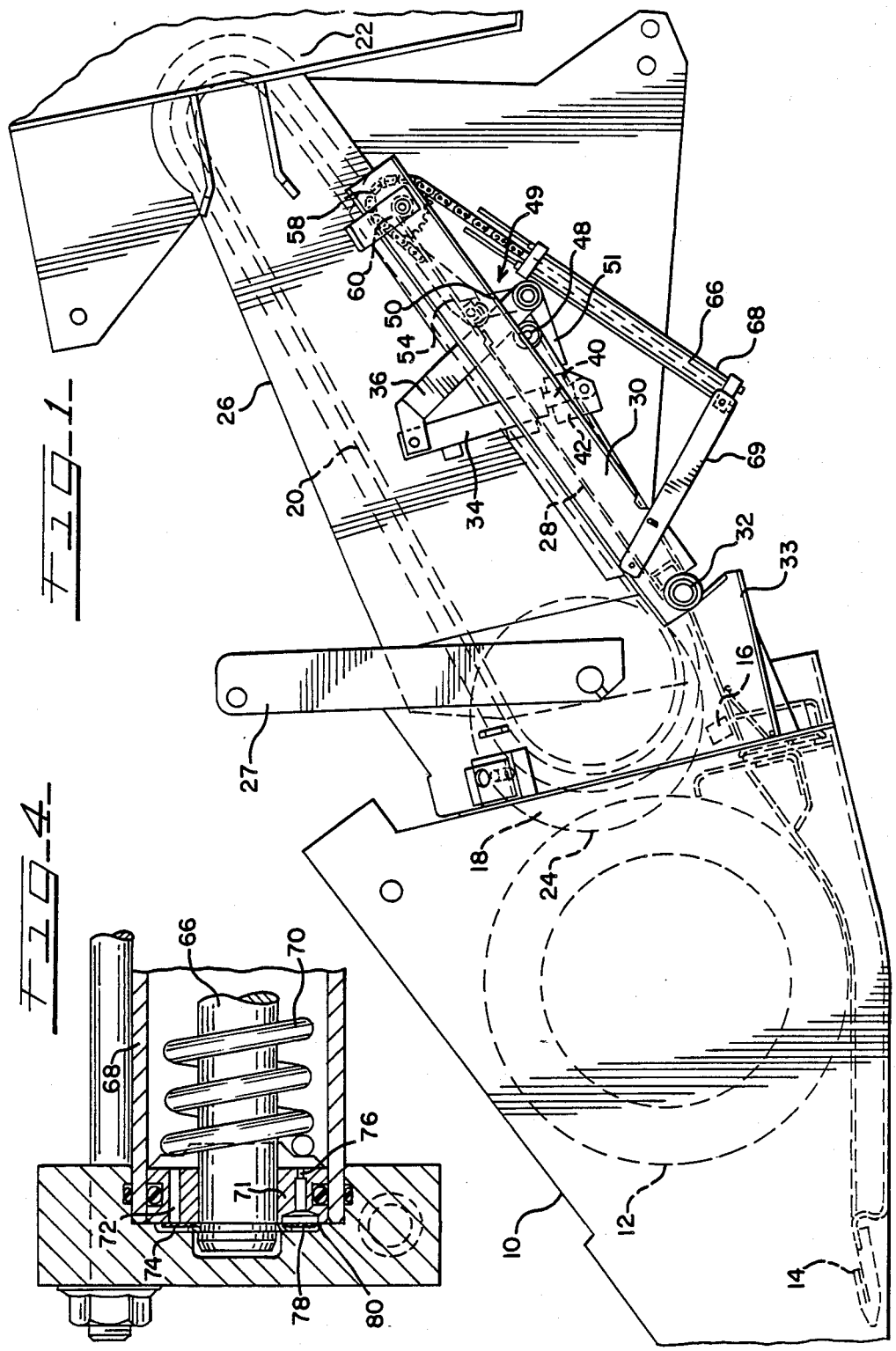

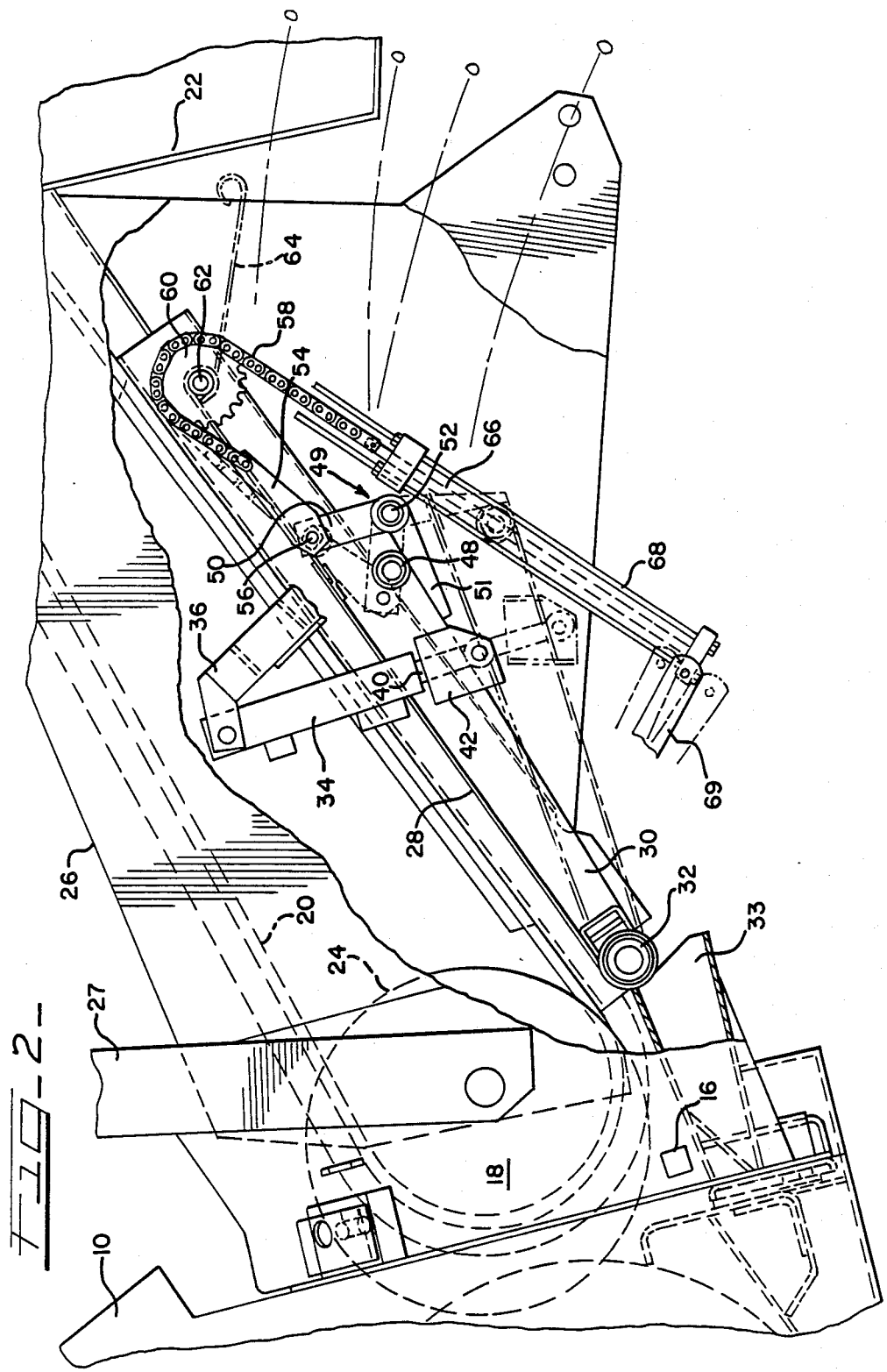
FIG_2

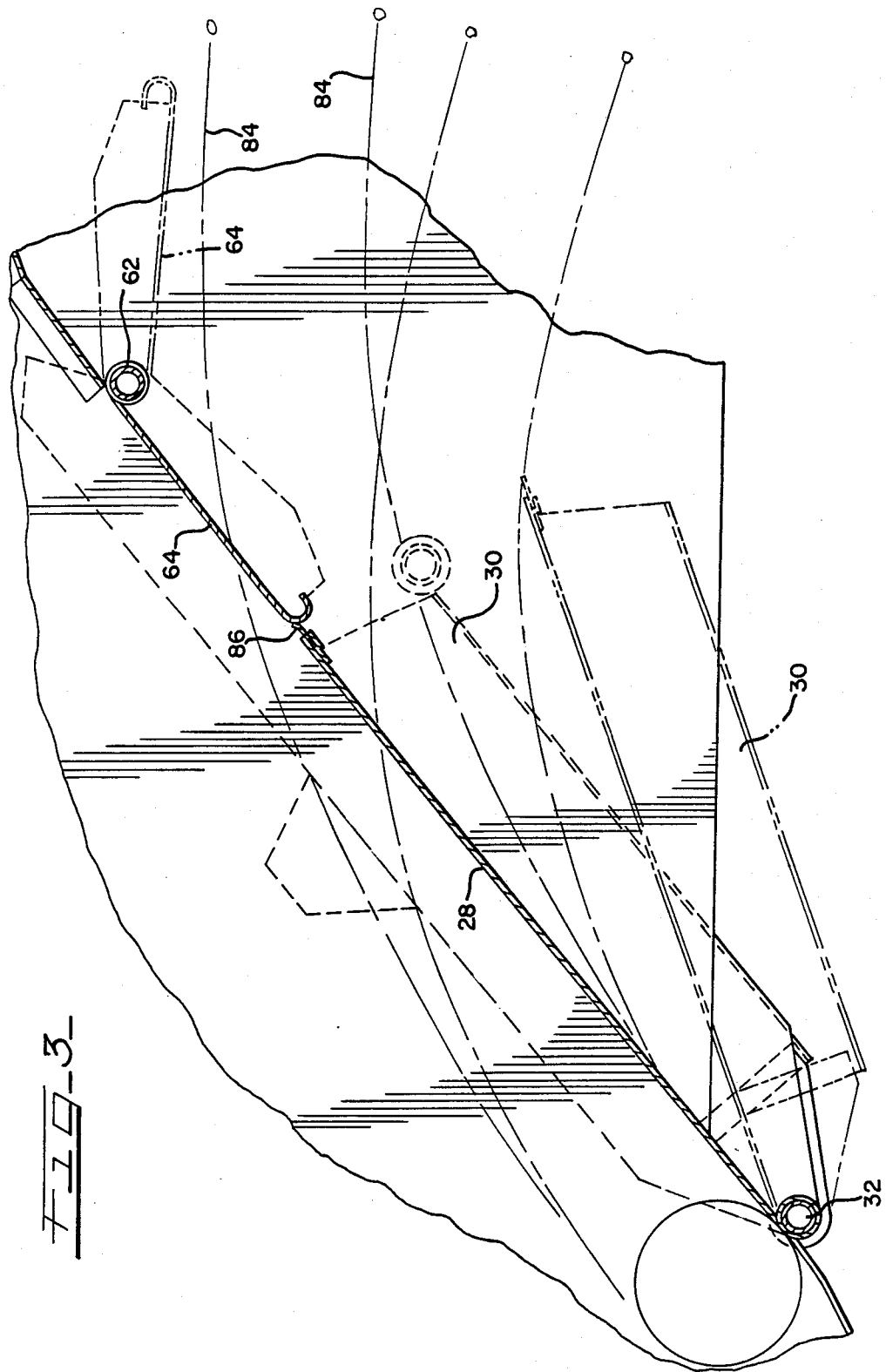

STONE EJECTION DOOR MECHANISM FOR HARVESTING EQUIPMENT

BACKGROUND OF THE INVENTION

This invention relates to agricultural machines and, more particularly, to a harvesting machine, which during its operation may pick up stones or other non-frangible objects along with the crop being harvested.

As can be appreciated, the harvesting machines, such as, a combine, are susceptible to damage by non-frangible objects such as stones, or other hard objects (hereinafter referred to simply as "stones") that may be injested during the harvesting process. There have been various stone detecting and eliminating systems for protecting combines, as illustrated in various prior art patents. For example, there are a group of U. S. patents assigned to the Sperry Corporation which disclose various mechanisms for sensing the presence of a stone and for ejecting the stone to avoid its being introduced into the combine and destroying threshing mechanisms. The patents in question are: U.S. Pat. Nos. 4,275,546; 4,322,933; 4,335,563; 4,335,564; 4,335,565; and 4,353,199. As aforementioned, these patents disclose various detector systems for eliminating rocks from a combine wherein the sensing mechanism is located generally adjacent to an elevating crop conveyor mechanism.

While these various mechanisms have been generally successful, they are subject to the disadvantage that the trap door mechanisms employed may be open longer than desired, which would result in wasting of the crop. When the stones are detected, a trap door mechanism is opened and the stones and the associated harvested crop material are ejected from the combine.

Accordingly, there is a need for a mechanism which will provide for the rapid exit of the stones from the combine before they can damage the harvesting mechanism and will also facilitate closing of the trap door mechanism to minimize crop loss. It is also desirable that the trap door mechanism close in a manner to redirect material flow into the combine and preventing crop from being lodged between the trap doors.

SUMMARY OF THE INVENTION

In accordance with the present invention, there is provided a door mechanism comprising front and rear doors in which the front door is opened in response to a signal that senses a stone entering the area of the signal mechanism along with the crop. Upon starting to open the front door, the rear door is rapidly opened to provide an immediate large opening for the stones to be ejected from the combine before they can be introduced into the threshing mechanism and cause damage thereto. When the stones pass to the sensing mechanism and only crops are being fed into the combine, the front door is closed to redirect the crop into the combine and the rear door moves to the closed position.

Numerous other advantages and features of the present invention will become readily apparent from the following detailed desription of the invention, from the claims, and from the accompanying drawings.

BRIEF DESCRIPTION OF THE DRAWINGS

In the accompanying drawings forming part of the specification, and in which like numerals are employed to designate like parts throughout the same, FIG. 1 is a side elevation of the front portion of a combine incorporating the novel stone ejection mechanism;

FIG. 2 is an enlarged view of the trap door mechanism, with various parts broken away;

FIG. 3 is a view showing the doors in the open and closed positions; and

FIG. 4 is a partial cross-sectional view of the dampening mechanism attached to the control mechanism for the rear door.

Referring now to FIG. 1, there is shown a combine grain header 10 in which there is incorporated a header collecting auger 12. Disposed adjacent the forward portion of the grain header 10 is a sickle or cutting bar 14 which first contacts the crop to be cut, after which it is introduced into the throat of the combine by the header collecting auger 12. Located immediately adjacent to the header collecting auger is a sound-detection mechanism 16 (schematically illustrated), which is used to sense the sound of stones, or other foreign objects, that enter the grain header along with the crop. Other types of sensing devices can be used, such as an X-ray device, if desired.

The sensing mechanism employed is a simple electronic device that will sense the noise made by the stone and is designed so that it will filter out other noises so that the operation of the trap door mechanism which is essentially controlled by the sound detector 16 will only be opened in response to stones being admitted into the grain header. The crop from the collecting auger 12 is directed against a retractable finger auger 18 which grabs the material and moves it underneath the chain and slat conveyor 20 over the trap doors, from where it is directed into the combine entrance 22. Numeral 24 indicates the path of the retractable finger auger 18. The retractable finger auger 18 and chain and slat conveyor 20 are disposed within the feeder housing 26, which is secured to the main frame of the combine. The support member 27 supports the feeder housing 26 relative to the combine.

Located adjacent the bottom portion of the feeder housing 26 is the trap door mechanism that is opened to eject stones that are sensed by the sound detector 16 immediately prior to the stones entering the area of the stone ejection door means. The front door 28 of the trap door mechanism is connected to the side frame 30 and is pivotally connected at 32 to the feeder housing 26. The front door pivot 32 is secured to a pivot support bracket 33.

The opening and closing of the front door is controlled by a hydraulic control mechanism including a cylinder 34 that is connected at its upper end to a support bracket 36 that is suitably connected to the feeder housing 26. The hydraulic cylinder 34 is a double-acting cylinder that includes a piston (not shown) and a piston rod 40 connected to the piston. The piston rod is moved by the introduction of fluid under pressure to one side or the other of the piston to lower or raise the piston rod to effect opening or closing, respectively, of the front door 28. The regulation of fluid pressure to the cylinder is controlled by a conventional valve mechanism (not shown), which is regulated in response to the sensing mechanism 16. While only one cylinder 34 is shown, two may be employed, one being located on each side of the front door.

The piston rod 40 is connected at its lower end to a bracket 42 secured to the side frame 30. Essentially, a stone entering the combine will be sensed by the signal device 16 and effect operation of a valve mechanism to introduce fluid under pressure above the piston in the cylinder 34 and release fluid from below the piston. This will result in the piston and piston rod 40 moving down to open the front door. A time delay will allow passing of the stone and then will activate the valve mechanism changing its position to reverse the pressures acting on the opposite sides of the piston in the cylinder 34 to raise the rod 40 and close the front door. In the illustrated embodiment, movement of the rod 40 moves the side frame and attached front door in a clockwise direction into its open position.

The opening of the front door 28 effects opening of the rear door through a novel mechanism that includes a roller 48 that is suitably secured to the side frame member 32 and moves therewith. This roller 48 is normally in the position shown in FIG. 1, in which the front door 28 is in the closed position. In this position, the roller 48 engages an arm 51 of a bell crank 49 that is pivotally connected through a pivot mechanism 52 to the feeder housing 26. The upper arm 50 of the bell crank 49 is connected to a chain bracket 54 by means of the pivot pin 56. The other end of the chain bracket 54 is connected to a chain 58 that is disposed about a sprocket 60. A pivot pin 62 connected to the rear door 64 and sprocket axle is coaxial. Thus, movement of the sprocket 60 in a counterclockwise direction will rotate the pivot pin 62 and thus rotate the rear door 64 from a closed to an open position.

The other end of the chain 58 is connected to a cylinder rod 66 disposed in a cylinder 68. The cylinder 68 is anchored to the feeder housing 26 by an anchor support 69.

As shown in partial cross section in FIG. 4, there is located within the cylinder housing 68 and surrounding the cylinder rod 66 a spring 70. This compression spring 70 acts against a piston member 71 secured to the rod 66 to normally bias the chain 58 and sprocket 60 in the clockwise direction to maintain the rear door 64 closed. The interior of the cylinder surrounding the rod 66, spring 70, and piston 71 is filled with liquid. As will be discussed hereinafter, with this arrangement, the cylinder assembly serves as a dash pot to dampen the closing movement of the rear door.

Specifically, when the crank arm 49 is moved in a counterclockwise direction by the roller 48 to the position shown in dotted lines in FIG. 2, the chain bracket 54 and associated chain 58 are moved in a counterclockwise direction. This moves the sprocket 60 and pivot pin 62 counterclockwise to rotate the door 64 into the open position. This action moves the piston 71 outwardly (to the right, as shown in FIG. 4) against the action of the spring 70, which is permitted at a relatively rapid rate, since the liquid in the cylinder 68 will move quickly from one side of the piston 71 to the other through the port 72 and orifice 76. The flap valves 74,78 do not impede the flow of fluid therepast. It is to be noted that for reasons discussed hereinafter valve 74 will prevent flow of fluid through port 72 when piston 71 is moved to the left by spring 70, whereas valve 78 provides a continuously open gap 80, so that fluid can move therethrough and orifice 76 when the piston 71 is moved to the left.

During the opening movement of the front door 28, the first 5° opening of the front door opens the rear door approximately 130° and holds it open until the front door cycles open and then back to the 5° position.

When the signal is deactivated, which results in opposite movement of the piston in the cylinder 34, the piston rod 40 is moved upward to move the front door 28 in the closing direction. As this occurs, the spring 70 acting on the piston 71 in the cylinder 68 moves the piston to the left, as shown in FIG. 4. The movement in this direction will be somewhat slower, since it can only move past the gap 80 provided adjacent the valve 78 and then through orifice 76 to provide a dash-pot effect. Thus, the closing movement of the rear door will be slowed down due to the fact that it can only close as fast as the liquid in the chamber to the left of the piston moves back to the right-hand side of the piston.

It remains to note that the front door 28 is provided with a transversely extending sealing gasket 86 that is contacted by the rear door 64 during closing. The front door closes first and then the rear door closes, with the result that the front door directs the crop into the combine, which prevents hair-pinning of the crop on the front edge of the rear door.

The operation of applicants' novel stone ejecting mechanism will be clear from the following.

Method of Operation

Crop cut by the sickle bar 14 is fed into the grain header 10 and comes into contact with the header collecting auger 12. The crop is directed into the area beneath the conveyor 20 by a retractable finger auger 18. If there are stones in the crop material, the sound detector 16 senses the presence of such stones and energizes a valve mechanism to permit the introduction of fluid above the piston in the hydraulic cylinder 34, while at the same time releasing fluid located below the piston in the cylinder 34. The piston and associated piston rod 40 are moved downwardly to move the side frame 30 and associated front door 28 about the front door pivot 32 to move the front door to the open position.

As the front door 28 moves downwardly, the roller 48 associated with the frame 30 engages the arm 51 of the bell crank 49. Counterclockwise movement of the bell crank 59 moves the chain 58 and sprocket 60 in a counterclockwise direction. When this occurs, the pivot pin 62 moves with the axle of the sprocket 60, and moves the rear door 64 to the open position. Due to the relatively small diameter of the sprocket, the rotation thereof results in the rapid opening movement of the rear door. When the doors are open, stones are ejected along the stone ejection paths 84 illustrated in FIG. 2.

A time delay allows passing of the stone and then activates the control mechanism controlling the hydraulic pressure in the cylinder 34 is reversed with result that the piston and piston rod 40 are moved upwardly to move the front door to its closed position. As this occurs, the spring 70 in the cylinder 68 acts against the piston 71 to move the chain 58 and sprocket 60 in a clockwise direction to move the rear door into its closed position more slowly than it moved to its opening position due to the dash-pot effect of the piston 71 in the cylinder 68.

It is intended to cover by the appended claims all such modifications that fall within the true spirit and scope of the invention.

What is claimed is:

1. In a crop harvesting machine having a feeder housing through which harvested crop is conveyed along a feed path, said feeder housing having disposed therein a sensing means for detecting the presence of stones or other non-frangible objects in said crop feed path and emitting a signal to indicate said detection; trap door means including a front and rear door mounted relative to said feeder housing below said feed path for movement between a closed position in which crop material can move uninterruptedly along said feed path into the harvester and an open position in which said objects can be ejected from said feed path; means for releasably holding the door means in said closed position; said release means comprising hydraulic means responsive to said sensing means to open and close said front door and means responsive to the opening and closing of said front door to effect opening and closing of said rear door to facilitate ejecting of said objects when they approach said door means and permit uninterrupted flow of said crop material when no objects are disposed therein.

2. A stone ejection mechanism as set forth in claim 1 in which said means responsive to the movement of said front door for opening said rear door includes a sprocket chain and a sprocket assembly disposed coaxially with a pivot support for the rear door and means interconnecting said front door and sprocket chain, and means for normally biasing said rear door to its closed position, whereby movement of said sprocket chain and opening of said rear door responds to the movement of said front door.

3. A stone ejection mechanism as set forth in claim 2 in which the means interconnecting said front door with said sprocket chain includes a bell crank secured to said feeder housing, one end of which is connected to said sprocket chain and the other end of which is engaged by a roller means connected to said front door, whereby movement of said front door moves the bell crank which moves the sprocket chain to move the rear door to its open position.

4. A stone ejection mechanism as set forth in claim 3 in which the other end of the sprocket chain is connected to a dash-pot mechanism, which includes a spring-biased rod connected to the chain which normally acts to bias the chain and sprocket to move the rear door into its closed position and said dash-pot means slows down the movement of the rear door as it is moved to its closed position.

* * * * *